US008453254B2

(12) United States Patent
Nishimura (10) Patent No.: US 8,453,254 B2
(45) Date of Patent: May 28, 2013

(54) CONTENT RECEIVER, CONTENT REPRODUCER, CONTENT REPRODUCING SYSTEM, CONTENT WRITING-OUT METHOD, VIEWING EXPIRATION TIME DETERMINING METHOD, AND PROGRAM (75) Inventor: Takuya Nishimura, Osaka (JP)

(73) Assignee: Panasonic Corporation, Osaka (JP)

( * ) Notice: Subject to any disclaimer, the term of this patent is extended or adjusted under 35 U.S.C. 154(b) by 301 days.

(21) Appl. No.: 12/828,644

(22) Filed: Jul. 1, 2010

(65) Prior Publication Data

US 2011/0067111 A1  Mar. 17, 2011

(30) Foreign Application Priority Data

Sep. 14, 2009 (JP) ................................. 2009-211394
Mar. 23, 2010 (JP) ................................. 2010-066659

(51) Int. Cl.
*H04L 29/06* (2006.01)
(52) U.S. Cl.
USPC ............................................ 726/27; 380/227
(58) Field of Classification Search
USPC ...................... 726/27; 380/227, 230, 231
See application file for complete search history.

(56) References Cited

U.S. PATENT DOCUMENTS

| 5,825,876 | A * | 10/1998 | Peterson, Jr. ........................ 705/52 |
| 7,047,559 | B2 | 5/2006 | Ohmori |
| 7,065,507 | B2 | 6/2006 | Mohammed et al. |
| 7,080,043 | B2 | 7/2006 | Chase, Jr. et al. |
| 7,089,425 | B2 | 8/2006 | Chan |
| 7,188,224 | B2 | 3/2007 | Ohta et al. |
| 7,243,242 | B2 | 7/2007 | Moriai |
| 7,539,306 | B2 | 5/2009 | Ohta et al. |
| 7,567,671 | B2 | 7/2009 | Gupte |
| 7,752,433 | B2 | 7/2010 | Yamauchi et al. |
| 7,945,517 | B2 | 5/2011 | Hori et al. |
| 7,974,926 | B2 | 7/2011 | Ohmori et al. |
| 8,234,217 | B2 | 7/2012 | Derrenberger |
| 2002/0007456 | A1 | 1/2002 | Peinado et al. |
| 2002/0085714 | A1 | 7/2002 | Inoha et al. |

(Continued)

FOREIGN PATENT DOCUMENTS

JP  2000-200367  7/2000
JP  2001-229229  8/2001

(Continued)

OTHER PUBLICATIONS

Satoh, Kensuke, copending U.S. Appl. No. 12/848,504, filed Aug. 2, 2010.

(Continued)

*Primary Examiner* — Edward Zee
(74) *Attorney, Agent, or Firm* — Wenderoth, Lind & Ponack, L.L.P.

(57) ABSTRACT

A content receiver writes out, together with content received from a content server, time supply source designation information indicating a second time supply source designated by a copyright protection system (DRM) to an exchangeable medium in association with the content. When the time supply source designation information is recorded in the exchangeable medium, a content reproducer performs viewing expiration time determination for the content recorded in the exchangeable medium referring time obtained on the basis of the second time supply source indicated by the time supply source designation information instead of a first time supply source referred to in order to specify present time used in determining a viewing expiration time in a content protection system (CPS).

6 Claims, 4 Drawing Sheets

FILE ENTRY 300
CONTENT FILE NAME 301
CONTENT ATTRIBUTE INFORMATION 302
VIEWING EXPIRATION TIME MANAGEMENT INFORMATION 303
TIME REFERENCE DESTINATION URL 304

| ENTRY NUMBER | CONTENT FILE NAME | ATTRIBUTE INFORMATION | DECRYPTION KEY | VIEWING EXPIRATION TIME MANAGEMENT INFORMATION | TIME REFERENCE URL |
|---|---|---|---|---|---|
| 1 | dist001.cpx | TITLE =··· PROGRAM LENGTH =··· | 0x12345678 | VIEWING START = N/A VIEWING TERM = 72 HOURS | https://www.tt.cpxm.org |
| 2 | rec001.cpx | TITLE =··· PROGRAM LENGTH =··· | 0xF234A988 | VIEWING START = N/A VIEWING TERM = INDEFINITE | (N/A) |
| 3 | dist002.cpx | TITLE =··· PROGRAM LENGTH =··· | 0xBB830899 | VIEWING START = 2009/7/8/13:00 VIEWING TERM = 72 HOURS | https://www.tt.cpxm.org |
| 4 | dist003.cpx | TITLE =··· PROGRAM LENGTH =··· | 0x23453386 | VIEWING START = N/A VIEWING TERM = 72 HOURS | (N/A) |
| .. | ... | ... | ... | ... | ... |

U.S. PATENT DOCUMENTS

| | | |
|---|---|---|
| 2002/0120667 A1 | 8/2002 | Nakano |
| 2002/0183985 A1 | 12/2002 | Hori et al. |
| 2002/0184154 A1 | 12/2002 | Hori et al. |
| 2002/0191764 A1 | 12/2002 | Hori et al. |
| 2003/0014655 A1 | 1/2003 | England et al. |
| 2003/0059203 A1 | 3/2003 | Fukushima |
| 2003/0077074 A1 | 4/2003 | Okamoto et al. |
| 2003/0084306 A1 | 5/2003 | Abburi et al. |
| 2004/0037424 A1 | 2/2004 | Numao et al. |
| 2004/0133923 A1 | 7/2004 | Watson et al. |
| 2004/0236788 A1 | 11/2004 | Sato et al. |
| 2005/0015343 A1 | 1/2005 | Nagai et al. |
| 2005/0038757 A1 | 2/2005 | Wada |
| 2005/0086478 A1 | 4/2005 | Peinado et al. |
| 2005/0192907 A1 | 9/2005 | Blinn et al. |
| 2005/0240974 A1 | 10/2005 | Hiramoto et al. |
| 2005/0244008 A1 | 11/2005 | England et al. |
| 2005/0289072 A1 | 12/2005 | Sabharwal |
| 2006/0064762 A1 | 3/2006 | Kayashima et al. |
| 2006/0080742 A1 | 4/2006 | Nakayama et al. |
| 2006/0224521 A1* | 10/2006 | Lakamp et al. .............. 705/59 |
| 2006/0238653 A1 | 10/2006 | Tobita |
| 2007/0027812 A1 | 2/2007 | Ogawa et al. |
| 2007/0031116 A1 | 2/2007 | Takatsuka et al. |
| 2007/0124602 A1* | 5/2007 | Wald et al. .............. 713/193 |
| 2007/0186266 A1 | 8/2007 | Watson et al. |
| 2008/0031591 A1 | 2/2008 | Okamoto et al. |
| 2008/0168515 A1 | 7/2008 | Benson et al. |
| 2009/0202071 A1 | 8/2009 | Kato |
| 2009/0265539 A1 | 10/2009 | Koyasu et al. |
| 2010/0281275 A1 | 11/2010 | Lee et al. |
| 2011/0110516 A1 | 5/2011 | Satoh |
| 2012/0110119 A1 | 5/2012 | Levicki et al. |

FOREIGN PATENT DOCUMENTS

| | | |
|---|---|---|
| JP | 2002-7912 | 1/2002 |
| JP | 2002-202917 | 7/2002 |
| JP | 2002-217894 | 8/2002 |
| JP | 2002-251819 | 9/2002 |
| JP | 2003-288274 | 10/2003 |
| JP | 2004-021882 | 1/2004 |
| JP | 2005-250613 | 9/2005 |
| JP | 2006-518889 | 8/2006 |
| JP | 3874236 | 11/2006 |
| JP | 2007-042204 | 2/2007 |
| WO | 2004/077786 | 9/2004 |

OTHER PUBLICATIONS

Office Action issued Aug. 9, 2012 in related U.S. Appl. No. 12/848,504.

* cited by examiner

FILE ENTRY 300
CONTENT ATTRIBUTE INFORMATION 302
VIEWING EXPIRATION TIME MANAGEMENT INFORMATION 303
TIME REFERENCE DESTINATION URL 304
CONTENT FILE NAME 301

| ENTRY NUMBER | CONTENT FILE NAME | ATTRIBUTE INFORMATION | DECRYPTION KEY | VIEWING EXPIRATION TIME MANAGEMENT INFORMATION | TIME REFERENCE URL |
|---|---|---|---|---|---|
| 1 | dist001.cpx | TITLE = ··· PROGRAM LENGTH = ··· | 0x12345678 | VIEWING START = N/A VIEWING TERM = 72 HOURS | https://www.tt.cpxm.org |
| 2 | rec001.cpx | TITLE = ··· PROGRAM LENGTH = ··· | 0xF234A988 | VIEWING START = N/A VIEWING TERM = INDEFINITE | (N/A) |
| 3 | dist002.cpx | TITLE = ··· PROGRAM LENGTH = ··· | 0xBB830899 | VIEWING START = 2009/7/8/13:00 VIEWING TERM = 72 HOURS | https://www.tt.cpxm.org |
| 4 | dist003.cpx | TITLE = ··· PROGRAM LENGTH = ··· | 0x23453386 | VIEWING START = N/A VIEWING TERM = 72 HOURS | (N/A) |
| ⋮ | ⋮ | ⋮ | ⋮ | ⋮ | ⋮ |

CONTENT RECEIVER, CONTENT REPRODUCER, CONTENT REPRODUCING SYSTEM, CONTENT WRITING-OUT METHOD, VIEWING EXPIRATION TIME DETERMINING METHOD, AND PROGRAM

BACKGROUND OF THE INVENTION

1. Field of the Invention

The present invention relates to a content receiver, a content reproducer, a content reproducing system, a content writing-out method, a viewing expiration time determining method, and the like for downloading rental content protected by copyright from a content server on a network, writing out the rental content to an exchangeable medium together with a viewing expiration time, and determining a viewing expiration time on the exchangeable medium with the content reproducer to determine possibility of reproduction of the content.

2. Background Art

In recent years, according to the development of the Internet, techniques for downloading and reproducing movies, music, and the like are generally used. A large number of services for downloading contents from servers, which perform content delivery of movies, music, and the like, to PCs, AV apparatuses, cellular phones, and portable apparatuses through networks are provided.

As forms of such content delivery services, there are content sales of a sell-off type with which a user can permanently view purchased content and rental sales with which a user can view downloaded content within a limited viewing expiration time.

In the typical content sales of a download type, a content provider which supplies content operates a content server and a DRM server and a content receiver on a viewer side downloads encrypted rental content from the content server and acquires a decryption key for the encrypted content and viewing conditions for the content from the DRM server. The viewing conditions for the content include information concerning a viewing expiration time in which a user is permitted to view the content and a copy condition for the content. When the content receiver reproduces the rental content, the content receiver refers to a viewing expiration time designated from the DRM server and, if the viewing expiration time has not expired, starts reproduction of the content and, if the viewing expiration time has expired, carries out deletion of the content. As a viewing expiration time managing method of this type, for example, there is a method described in Patent Document 1 (Japanese Patent Application Laid-Open No. 2003-288274).

Figure 4:
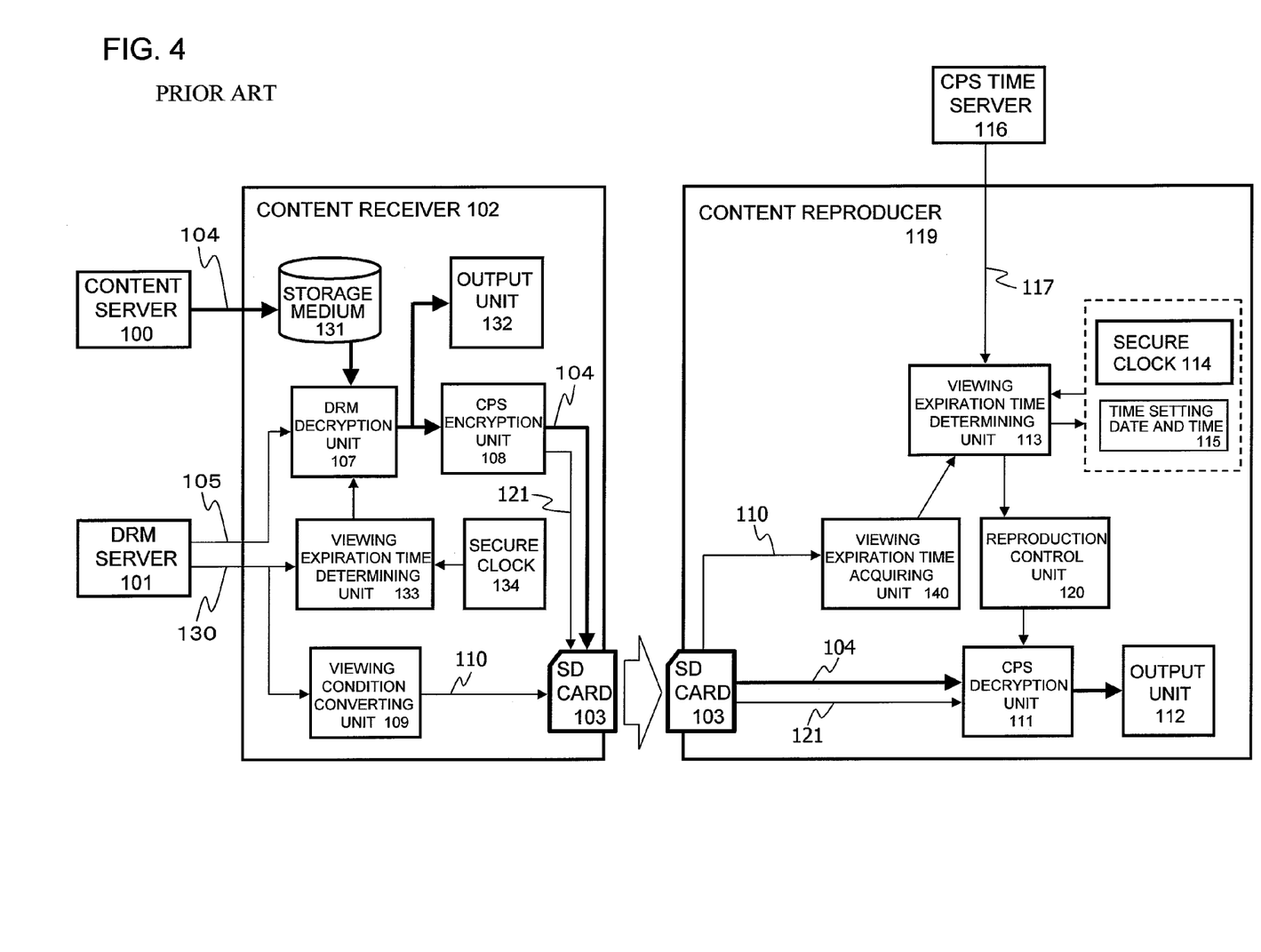
FIG. 4 is a diagram of a conventional content delivery system.

A diagram of a conventional content delivery system for explaining the concept of a viewing expiration time managing method for rental content in conventional content download is shown in FIG. 4.

A content receiver 102 accesses, via a network (not shown), a content server 100 and a DRM server 101 operated by a content provider.

When the content receiver 102 carries out download of rental content separately designated by a user, the content receiver 102 downloads encrypted content 104 from the content server 100 and stores the content 104 in a storage medium 131 such as a built-in HDD and, at the same time, acquires a content key 105 for decryption of the encrypted content 104 and viewing conditions 130 such as a viewing expiration time for the content 104 from the DRM server 101.

When the content receiver 102 itself carries out reproduction of the content, a viewing expiration time determining unit 133 reads out present date and time information from a secure clock 134 and compares the present date and time information with the viewing expiration time included in the viewing conditions 130 acquired from the DRM server 101 to thereby determine whether the viewing expiration time for the content 104 has expired. Thereafter, if the viewing expiration time for the content 104 has not expired, the viewing expiration time determining unit 133 causes a DRM decryption unit 107 to decrypt the encrypted content 104 using the content key 105 and causes an output unit 132 to output the content 104 to reproduce the content 104.

In the following explanation, as a further developed form of the above, the content receiver 102 writes out, to an SD card 103, the content 104 as rental content received from the content server 100 and the user performs viewing in a content reproducer 119 separate from the content receiver 102.

The content receiver 102 decrypts, in the DRM decryption unit 107, the encrypted content 104 using the content key 105, carries out encryption again in a CPS encryption unit 108 in a CPRM (Contents Protection for Removable Media) format, which is a CPS (Contents Protection System) for an SD card, writes the content 104 in the SD card 103, and writes a CPS key 121 used for decryption of a CPS cipher in association with the content 104. A viewing condition converting unit 109 of the content receiver 102 converts the viewing expiration time included in the viewing conditions 130 of the content 104 received from the DRM server 101 into a CPS format and records the viewing expiration time in the SD card 103 as a CPS viewing expiration time 110 in association with the content 104.

The content reproducer 119 is a content viewing terminal having a function of reproducing an SD card recorded in the CPRM format.

When the content reproducer 119 reproduces the content 104 recorded on the SD card 103 inserted in the content reproducer 119, first, a viewing expiration time acquiring unit 140 reads out the CPS viewing expiration time 110 associated with the content 104 from the SD card 103 and passes the CPS viewing expiration time 110 to the viewing expiration time determining unit 113. When the viewing expiration time determining unit 113 receives the CPS viewing expiration time 110 from the viewing expiration time acquiring unit 140, the viewing expiration time determining unit 113 reads out time setting date and time 115 stored in advance and reads out the present date and time information from the secure clock 114. The time setting date and time 115 is date and time information at the time when time setting for the secure clock 114 is performed last time, i.e., data and time information at the time when update of time of the secure clock 114 is performed last. The time setting date and time 115 is stored in the content reproducer 119.

As date and time management in this secure clock 114, CPS time 117 acquired from a CPS time server 116, which supplies CPS time, via the network is set in the secure clock 114 to perform hand movement management. Since a clock of an apparatus has an error, time information set once cannot be trusted forever. A period in which the CPS time 117 acquired from the CPS time server 116 is trusted is set in advance. For example, when one week elapses after the CPS time 117 is acquired, it is determined that errors accumulate and time cannot be trusted. The CPS time 117 is acquired from the CPS time server 116 again. However, until one week elapses, date and time information of the secure clock 114 updated and subjected to hand movement management on the basis of the CPS time 117 acquired last time is trusted. The reacquisition of the CPS time 117 from the CPS time server 116 is not performed.

In this way, the viewing expiration time determining unit 113 determines on the basis of the date and time information acquired from the secure clock 114 whether the CPS viewing expiration time 110 has not expired. When the CPS viewing expiration time 110 has not expired, the viewing expiration time determining unit 113 notifies a reproduction control unit 120 that reproduction of the content 104 is possible.

A CPS decryption unit 111 receives the notification that the reproduction of the content 104 is possible from the reproduction control unit 120, reads out the content 104 from the SD card 103, and outputs the content 104 of a plain text obtained by decrypting the content 104 with the CPS key 121 to an output unit 112. The output unit 112 decodes the content 104 and outputs the content 104 as an AV signal.

All the disclosures of the Document 1 are cited in its entirety and thereby become an integral part hereof.

However, in the related art, when content, a viewing expiration time for which is managed in the copyright protection system, is written out to a replaceable recording medium (in this specification, referred to as "exchangeable medium"), management of the viewing expiration time corresponding to reliability of time management specified by the copyright protection system cannot be applied to the written-out content.

Specifically, in the content reproducer 119 of the conventional content delivery system, viewing expiration time determination is performed on the basis of the CPS time 117 acquired from the CPS time server 116 completely independent from time management in the DRM server operated when the original content 104 is supplied from the content provider.

When the content provider enters into an agreement for content procurement from a content right holder, i.e., a movie production studio, usually, after examining in detail technical requirements in the content delivery system as the copyright protection system, i.e., a DRM system, the content provider persuades the content right holder to consent to the reliability of a DRM technique and then obtains a content procurement license in content business.

From a technical viewpoint, it is within the assumption of the technical requirements, to which the content provider and the content right holder consent, that the content 104 as the rental content is viewed in the content receiver 102 on the basis of accuracy and reliability of time management of the DRM system including the DRM server 101. When the content 104 protected by the DRM is output, i.e., exported to the CPS as a content protection system other than the DRM used for delivery, the content 104 protected under the management of the DRM until being delivered to and stored in the content receiver 102 is protected under the management of the CPS rather than under the management of the DRM after being exported to such as a SD card. However, it is not always guaranteed that accuracy and reliability of time management in the CPS at an export destination are equivalent to or higher than those in the DRM. Therefore, it is likely that the content 104 is exported to a CPS with low reliability of time management. This indicates likelihood that viewing conditions, i.e., viewable time and the like intended by the content provider and the content right holder are not observed.

Specifically, when accuracy of the CPS time server 116 is low, there is a shift in time, or fault tolerance is low compared with time reliability of the DRM system intended by the content provider, there is a problem in that the content reproducer 119 can reproduce the content 104 exceeding a range of the viewing expiration time for the content 104 licensed to the content receiver 102 by the DRM server 101 or, conversely, although there is still time until a viewing expiration time originally designated, it is determined by mistake that the viewing expiration time has expired.

In view of the conventional problems, it is an object of the present invention to provide a content receiver, a content reproducer, a content reproducing system, a content writing-out method, a viewing expiration time determining method, and the like which can apply, when content, a viewing expiration time for which is managed in a copyright protection system, is written out to an exchangeable medium, management of the viewing expiration time corresponding to reliability of time management specified by the copyright protection system even to the written-out content.

SUMMARY OF THE INVENTION

The $1^{st}$ aspect of the present invention is a content receiver which receives content, a viewing expiration time of which is managed in a copyright protection system, from a content server and writes out the content to an exchangeable medium managed in a content protection system, the content receiver comprising:

a writing-out unit which writes out, to the exchangeable medium, in association with the content, time supply source designation information indicating a second time supply source designated in the copyright protection system, instead of a first time supply source of the content protection system which a content reproducer having the exchangeable medium inserted therein refers to in order to specify present time used in determining a viewing expiration time in the content protection system.

The $2^{nd}$ aspect of the present invention is the content receiver according to the $1^{st}$ aspect of the present invention, wherein the writing-out unit also writes out, to the exchangeable medium, viewing expiration time information of the content given by the copyright protection system.

The $3^{rd}$ aspect of the present invention is the content receiver according to the $1^{st}$ aspect of the present invention, wherein the time supply source designation information written out to the exchangeable medium by the writing-out unit is a URL of a server managed in the copyright protection system.

The $4^{th}$ aspect of the present invention is the content receiver according to the $2^{nd}$ aspect of the present invention, further comprising a viewing condition converting unit which converts, when the viewing expiration time information of the content is length of time in which the content can be viewed, the viewing expiration time information of the content into deadline date and time until when the content can be viewed, wherein the writing-out unit writes out the viewing expiration time information converted by the viewing condition converting unit to the exchangeable medium.

The $5^{th}$ aspect of the present invention is a content reproducer which reproduces content recorded on an exchangeable medium managed in a content protection system, the content reproducer comprising:

a viewing expiration time determining unit which performs, when time supply source designation information indicating a second time supply source designated in a copyright protection system in association with content, a viewing expiration time of which is managed in the copyright protection system, is recorded on the exchangeable medium, viewing expiration time determination for the content recorded in the exchangeable medium referring to time obtained on the basis of the second time supply source indicated by the time supply source designation information, instead of a first time supply source in the content protection system referred to in order to specify present time used in determining a viewing expiration time in the content protection system.

The 6th aspect of the present invention is the content reproducer according to the 5th aspect of the present invention, wherein the first time supply source in the content protection system referred to by the viewing expiration time determining unit is a time server in the content protection system which is operated by the content protection system and supplies time information to plural content reproducers through a network.

The 7th aspect of the present invention is the content reproducer according to the 5th aspect of the present invention, further comprising a secure clock unit which subjects time to hand movement management using a secure clock which cannot be changed from a user, wherein the viewing expiration time determining unit performs the viewing expiration time determination for the content using time information acquired from the secure clock unit as the first time supply source in the content protection system.

The 8th aspect of the present invention is the content reproducer according to the 5th aspect of the present invention, wherein the second time supply source indicated by the time supply source designation information is a server managed in the copyright protection system used by a content receiver, which writes the content in the exchangeable medium, in receiving the content, and the viewing expiration time determining unit performs the viewing expiration time determination for the content using time information acquired from the server.

The 9th aspect of the present invention is the content reproducer according to the 5th aspect of the present invention, further comprising an intra-apparatus time supply source which is updated by time information acquired from the second time supply source indicated by the time supply source designation information and subjects time to hand movement management, wherein the viewing expiration time determining unit uses, in a period between the updates, for the viewing expiration time determination for the content recorded on the exchangeable medium, time information acquired from the intra-apparatus time source.

The 10th aspect of the present invention is the content reproducer according to the 5th aspect of the present invention, wherein the viewing expiration time determining unit decides the viewing expiration time on the basis of the time supply source designation information recorded on the exchangeable medium because, when the viewing expiration time is an undecided type, it is necessary to decide the viewing expiration time before determining whether the viewing expiration time has expired.

The 11th aspect of the present invention is the content reproducer according to the 10th aspect of the present invention, wherein the viewing expiration time of the undecided type is a length of time in which the content can be viewed given by the copyright protection system, and the viewing expiration time determining unit sets present time as start time when viewing is possible and decides the viewing expiration time of the undecided type on the basis of time acquired from the second time supply source designated by the time supply source designation information.

The 12th aspect of the present invention is a content reproducing system comprising: a content server which transmits content, a viewing expiration time of which is managed in a copyright protection system; a content receiver which receives the content from the content server and writes out the content to an exchangeable medium managed in a content protection system; and a content reproducer which reproduces the content recorded on the exchangeable medium, wherein the content receiver includes a writing-out unit which writes out time supply source designation information indicating a second time supply source designated in the copyright protection system to the exchangeable medium in association with the content, and the content reproducer includes a viewing expiration time determining unit which performs, when the time supply source designation information is recorded on the exchangeable medium, viewing expiration time determination for the content recorded in the exchangeable medium referring to time obtained on the basis of the second time supply source indicated by the time supply source designation information, instead of a first time supply source in the content protection system referred to in order to specify present time used in determining a viewing expiration time in the content protection system.

The 13th aspect of the present invention is a content writing-out method in a content receiver which receives content, a viewing expiration time of which is managed in a copyright protection system, from a content server and writes out the content to an exchangeable medium managed in a content protection system, the content writing-out method comprising writing out, to the exchangeable medium, in association with the content, time supply source designation information indicating a second time supply source designated in the copyright protection system, instead of a first time supply source of the content protection system which a content reproducer having the exchangeable medium inserted therein refers to in order to specify present time used in determining a viewing expiration time in the content protection system.

The 14th aspect of the present invention is a viewing expiration time determining method in a content reproducer which reproduces content recorded on an exchangeable medium managed in a content protection system, the viewing expiration time determining method comprising performing, when time supply source designation information indicating a second time supply source designated in a copyright protection system in association with content, a viewing expiration time of which is managed in the copyright protection system, is recorded on the exchangeable medium, viewing expiration time determination for the content recorded in the exchangeable medium referring to time obtained on the basis of the second time supply source indicated by the time supply source designation information, instead of a first time supply source in the content protection system referred to in order to specify present time used in determining a viewing expiration time in the content protection system.

The 15th aspect of the present invention is a program embodied on a non-transitory and tangible computer-readable medium, the program causing a computer to execute a content writing-out method in a content receiver which receives content, a viewing expiration time of which is managed in a copyright protection system, from a content server and writes out the content to an exchangeable medium managed in a content protection system, the content writing-out method comprising writing out, to the exchangeable medium, in association with the content, time supply source designation information indicating a second time supply source designated in the copyright protection system, instead of a first time supply source of the content protection system which a content reproducer having the exchangeable medium inserted therein refers to in order to specify present time used in determining a viewing expiration time in the content protection system.

The 16th aspect of the present invention is a program embodied on a non-transitory and tangible computer-readable medium, the program causing a computer to execute a viewing expiration time determining method in a content reproducer which reproduces content recorded on an exchangeable medium managed in a content protection system, the viewing expiration time determining method comprising performing, when time supply source designation information indicating a second time supply source designated in a copyright protection system in association with content, a viewing expiration time of which is managed in the copyright protection system, is recorded on the exchangeable medium, viewing expiration time determination for the content recorded in the exchangeable medium referring to time obtained on the basis of the second time supply source indicated by the time supply source designation information, instead of a first time supply source in the content protection system referred to in order to specify present time used in determining a viewing expiration time in the content protection system.

According to the present invention, it is possible to provide a content receiver, a content reproducer, a content reproducing system, a content writing-out method, a viewing expiration time determining method, and the like which can apply, when content, a viewing expiration time for which is managed in a copyright protection system, is written out to an exchangeable medium, management of the viewing expiration time corresponding to reliability of time management specified by the copyright protection system even to the written-out content.

REFERENCE SIGNS LIST 100 content server
101 DRM server
102 content receiver
103 SD card
104 content
105 content key
107 DRM decryption unit
108 CPS encryption unit
109 viewing condition converting unit
110 CPS viewing expiration time
111 CPS decryption unit
112 output unit
113 viewing expiration time determining unit
114 secure clock
115 time setting date and time
116 CPS time server
117 CPS time
119 content reproducer
120 reproduction control unit
121 CPS key
130 viewing conditions
131 storage medium
132 output unit
133 viewing expiration time determining unit
134 secure clock
140 viewing expiration time acquiring unit
200 time reference server URL
201 CPS time
202 viewing expiration time determining unit
203 secure clock
204 time setting date and time
205 viewing expiration time acquiring unit
206 viewing condition converting unit
210 content reproducer
211 content receiver
212 DRM server
213 DRM time server
300 file entry
301 content file name
302 content attribute information
303 viewing expiration time management information
304 time reference destination URL

DETAILED DESCRIPTION OF THE INVENTION

First Embodiment

A first embodiment of the present invention is explained below with reference to the drawings. In the following explanation, components having functions same as those in the conventional related art shown in FIG. 4 are denoted by the same numbers and explanation of the components is omitted.

Figure 1:
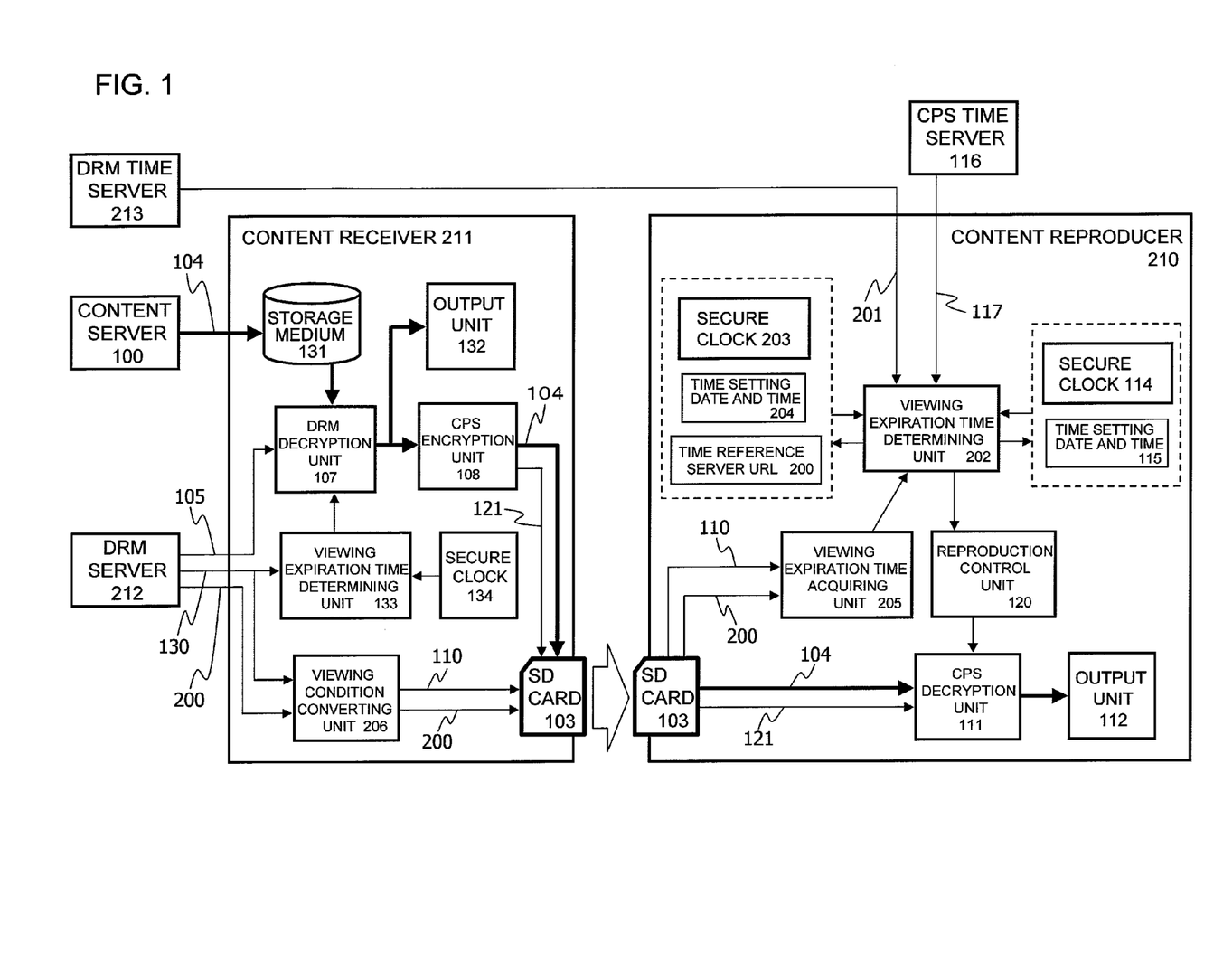
FIG. 1 is a diagram of a content delivery system in a first embodiment of the present invention.

FIG. 1 is a diagram of a content delivery system according to the first embodiment.

When a DRM server 212 supplies viewing conditions for the content 104 to a content receiver 211, the DRM server 212 supplies a time reference server URL 200 associated with the content 104.

When a viewing condition converting unit 206 of the content receiver 211 writes the CPS viewing expiration time 110 in the SD card 103, the viewing condition converting unit 206 writes, together with the CPS viewing expiration time 110, the time reference server URL 200 representing a location of this time reference server. A destination indicated by the time reference server URL 200 is a DRM time server 213. The DRM time server 213 includes a time acquisition API (Application Program Interface) for a CPS system and can supply CPS time 201 in response to a request from an arbitrary terminal. When viewing expiration time information included in the viewing conditions 130 obtained from the DRM server 212 is the length of time in which content can be viewed, the viewing condition converting unit 206 may convert the length of the time into deadline date and time until when the content can be viewed.

A viewing expiration time acquiring unit 205 in a content reproducer 210 reads out the CPS viewing expiration time 110 and the time reference server URL 200 from the SD card 103 and passes the CPS viewing expiration time 110 and the time reference server URL 200 to a viewing expiration time determining unit 202. When a significant character string is described in the time reference server URL 200 received from the viewing expiration time acquiring unit 205 and a valid server is present in an address described by the character string, the viewing expiration time determining unit 202 inquires the server indicated by the time reference server URL 200 of time instead of inquiring the CPS time server 116 of time. This inquiry determining operation is explained in detail later. A method of managing the CPS time 201 acquired from the server indicated by the time reference server URL 200 is managed in a secure clock 203 and time setting date and time 204 in the same manner as the management method performed by using the secure clock 114 and the time setting date and time 115. A difference between date and time management in the secure clock 114 and date and time management in the secure clock 203 is only that the stored time reference server URL 200 is referred to when the CPS time 201 is managed in the secure clock 203.

A DRM which protects content with the content server 100, the DRM server 212, and the DRM time server 213 corresponds to an example of a copyright protection system of the present invention. A CPS which protects content on an SD card corresponds to an example of a content protection system different from the copyright protection system. The CPS time server 116 corresponds to an example of a first time supply source of the present invention. The DRM time server 213 corresponds to an example of a second time supply source of the present invention. The SD card 103 managed by the CPS corresponds to an example of an exchangeable medium of the present invention. The exchangeable medium means a replaceable recording medium. By using the exchangeable medium such as the SD card 103 explained in this embodiment, it is possible to perform reading and writing with the content receiver 211 and also perform reading and writing with the content reproducer 210. The time reference server URL 200 corresponds to an example of time supply source designation information of the present invention. The viewing condition converting unit 206 which writes out the time reference server URL 200 to the SD card 103 corresponds to an example of reading-out unit of the present invention. The viewing condition converting unit 206 corresponds to an example of a viewing condition converting unit of the present invention. The viewing expiration time determining unit 202 of the content reproducer 210 corresponds to an example of a viewing expiration time determining unit of the present invention. The secure clock 134 corresponds to an example of a secure clock unit of the present invention. The secure clock 203 corresponds to an example of an intra-apparatus time supply source of the present invention.

Figure 2:
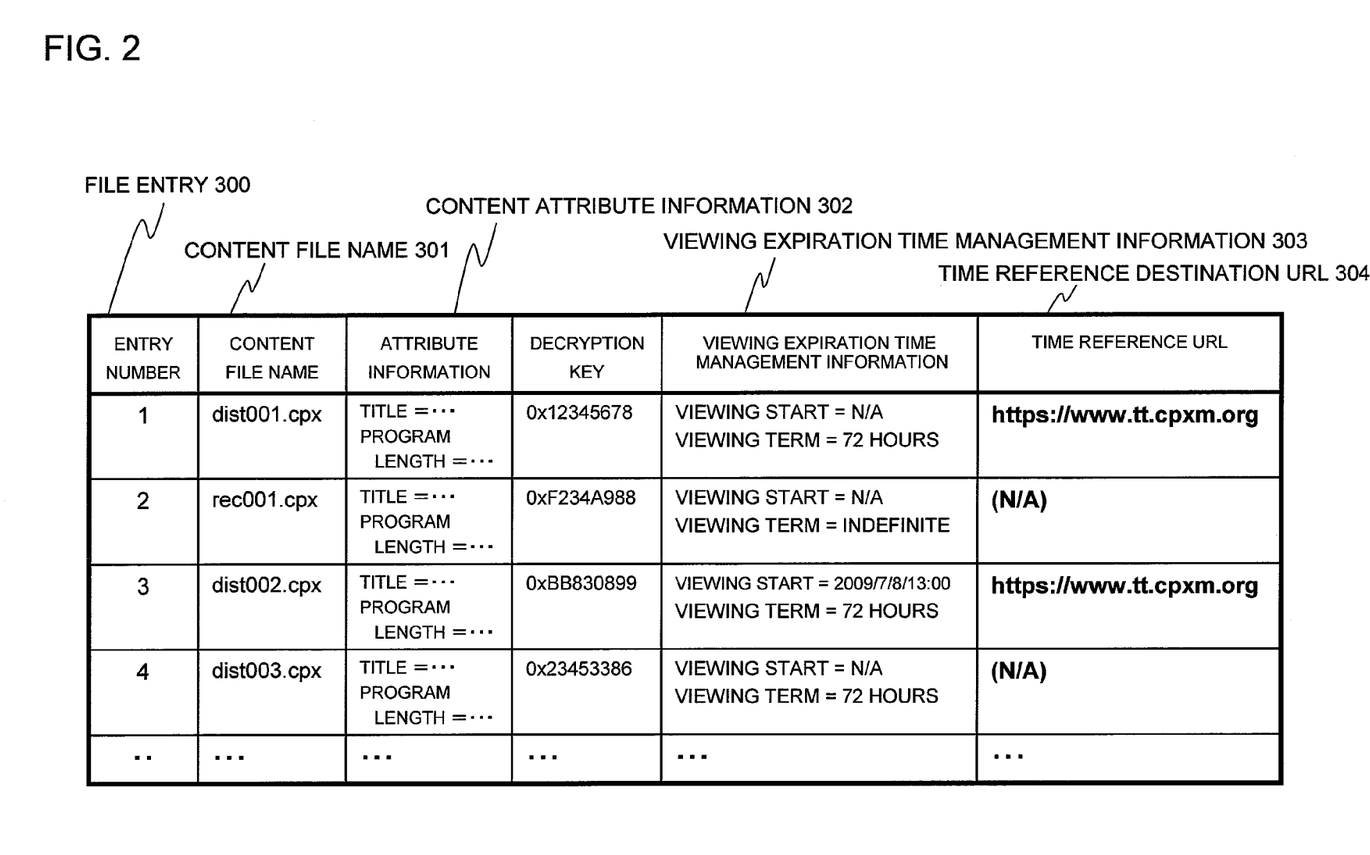
FIG. 2 is a diagram showing content management information on a CPS system according to the first embodiment of the present invention.

FIG. 2 is a diagram showing details of content management information on the SD card 103.

Contents recorded on the SD card 103 are individually identified according to a file entry 300. For each of the contents, a content file name 301, content attribute information 302, a decryption key, viewing expiration time management information 303, and a time reference destination URL 304 are recorded. In the time reference destination URL 304, information is not recorded depending on content (e.g., in FIG. 2, the time reference destination URL 304 of content rec001.cpx with an entry number 2 of the file entry 300 is represented by "N/A").

As a form of giving viewing expiration time information of rental content, in one case, the viewing expiration time information is given in a form in which a reproduction license condition for target content is designated by absolute date and time and, in the other case, the viewing expiration time information is given in a form in which, in order to decide a viewing expiration time when first viewing is performed on a terminal, absolute date and time is not designated when the viewing expiration time information is given and only a viewable period such as 72 hours is designated (the viewing expiration time is given as undecided).

In the viewing expiration time management information 303 of contents with an entry number 1 and an entry number 4 in the file entry 300 shown in FIG. 2, 72 hours is set as viewing term and viewing start date and time is in an unset state (represented as "N/A"). This indicates that these contents are contents of a type with a viewing expiration time given as undecided and for which first viewing is not performed yet.

On the other hand, in the viewing expiration time management information 303 of content with an entry number 3 in the file entry 300, 72 hours is set as viewing term and absolute date and time is set for viewing start. This indicates that a viewing expiration time for this content is set as absolute time from the beginning or this content is a type with a viewing expiration time given as decided and the viewing expiration time is decided because the content is already reproduced.

In the viewing expiration time management information 303 of content with an entry number 2 in the file entry 300, viewing term is indefinite. This indicates that this content can be freely reproduced forever and is content not subjected to viewing expiration time management.

Next, operation during viewing expiration time determination processing in the viewing expiration time determining unit 202 in reproducing the content 104 on the SD card 103 in the content reproducer 210 is explained.

Figure 3:
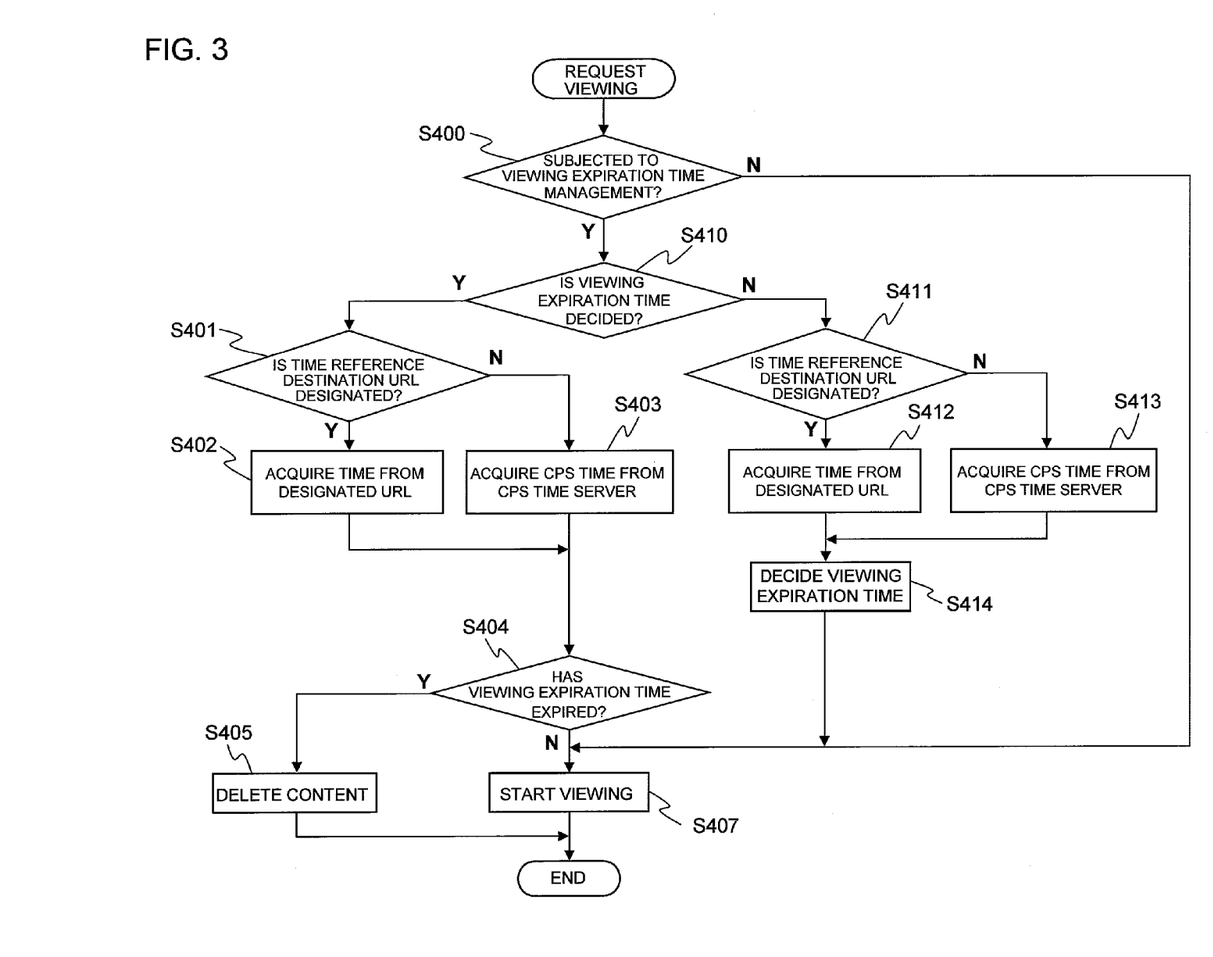
FIG. 3 is a flowchart showing a viewing expiration time determining method for a content reproducer in the first embodiment of the present invention.

FIG. 3 is a flowchart showing a viewing expiration time determining method in the viewing expiration time determining unit 202 of the content reproducer 210.

When the viewing expiration time determining unit 202 is about to start reproducing specific content on the SD card 103 according to an instruction (not shown) from a user, the viewing expiration time determining unit 202 searches through the file entry 300 and reads out related information of the content from the content management information.

The viewing expiration time management information 303 is included in this related information. The viewing expiration time determining unit 202 determines in step S400, first, whether the content is content subjected to the viewing expiration time management.

When viewing term of the viewing expiration time management information 303 is not set, i.e., when viewing term is indefinite as indicated by the entry number 2 shown in FIG. 2, the content is determined as content not subjected to the viewing expiration time management. The viewing expiration time determining unit 202 notifies the reproduction control unit 120 that the content can be reproduced. The reproduction control unit 120 instructs the CPS decryption unit 111 to perform decrypting operation. Reproduction of the content is started (step S407).

When it is determined in step S400 that the content is content subjected to the viewing expiration time management, next, the viewing expiration time determining unit 202 determines whether a viewing expiration time for the content is decided (step S410).

When significant values are set for viewing start and viewing term in the viewing expiration time management information 303 as indicated by the entry number 3 shown in FIG. 2, in step S410, the viewing expiration time determining unit 202 determines that the content is content for which the viewing expiration time is decided and proceeds to step S401.

In step S401, the viewing expiration time determining unit 202 acquires, from the viewing expiration time acquiring unit 205, the time reference server URL 200 described in the time reference destination URL 304 of the content of the viewing expiration time management information 303 and determines whether a significant URL is described in the time reference server URL 200. If a significant URL is not described, in step S403, the viewing expiration time determining unit 202 acquires the CPS time 117 from the normal CPS time server 116. If a significant URL is described, in step S402, the viewing expiration time determining unit 202 acquires the CPS time 201 from a server indicated by the time reference server URL 200 designated by the time reference destination URL 304 rather than the normal CPS time server 116. In this case, a URL of the DRM time server 213 is described in the time reference destination URL 304 of the content as the time reference server URL 200. Therefore, the viewing expiration time determining unit 202 acquires time from the DRM time server 213.

Next, the viewing expiration time determining unit 202 determines in step S404, using the time information acquired in step S402 or step S403, whether the viewing expiration time described in the viewing expiration time management information 303 has already expired.

In the content management information shown in FIG. 2, date and time for viewing start and viewing term are described in the viewing expiration time management information 303. Therefore, in this case, with date and time obtained by adding the viewing term to the viewing start date and time set as a viewing expiration time for the content (viewable last date and time), the viewing expiration time determining unit 202 determines the passing of the viewing expiration time.

As a result, if the viewing expiration time has not expired, in step S407, the viewing expiration time determining unit 202 causes the reproduction control unit 120 to instruct the CPS decryption unit 111 to perform decrypting operation and causes the reproduction control unit 120 to start reproduction of the content. Conversely, when the viewing expiration time has expired, in step S405, the viewing expiration time determining unit 202 deletes the content.

In step S410, when the content is content, only viewing term of which is set and viewing start of which is not set in the viewing expiration time management information 303, like the content with the entry number 1 or the entry number 4 shown in FIG. 2, i.e., the content is content of the viewing expiration time undecided type, the viewing expiration time determining unit 202 determines that the content is content, a viewing expiration time for which is undecided, and proceeds to step S411.

In step S411, the viewing expiration time determining unit 202 checks whether the time reference destination URL 304 of the content is designated and acquires, according to presence or absence of the designation, time by performing the processing in step S412 or step S413.

In step S411, step S412, and step S413, the viewing expiration time determining unit 202 performs kinds of processing same as those in step S401, step S402, and step S403, respectively.

After acquiring the time in step S412 or step S413, the viewing expiration time determining unit 202 decides a viewing expiration time for the content (step S414). Specifically, the viewing expiration time determining unit 202 sets, in the viewing start in which a value is not set in the viewing expiration time management information 303 as the content management information, the present date and time acquired from the CPS time server 116 or the DRM time server 213 to thereby decides a viewing expiration time for the content.

After deciding the viewing expiration time for the content, the viewing expiration time determining unit 202 causes the reproduction control unit 120 to instruct the CPS decryption unit 111 to perform decrypting operation and causes the reproduction control unit 120 to start reproduction of the content (step S407).

In the first embodiment, for reference to CPS time in the content reproducer 210, time acquisition from the CPS time server 116 is explained as an example. However, a time acquiring method in a CPS terminal is not limited to this. For example, time superimposed on a broadcast wave and transmitted may be set as reference time of a terminal. It goes without saying the same effect can be obtained when a clock that performs hand movement management in an apparatus is referred to.

In the first embodiment of the present invention, time is acquired from the DRM time server 213 and time information is stored in the secure clock 203 every time a viewing expiration time is determined and decided. In this case, if the DRM time server 213 is inquired of time information once, time of the secure clock 203 is updated, and the time is advanced, during a predetermined period (e.g., one week) after the time is updated, it is also possible to use the time acquired from the secure clock 203 instead of inquiring the DRM time server 213 of time information. In other words, in a period between updates of the timing (e.g., every one week) for updating the time of the secure clock 203, the time acquired from the secure clock 203 may be used. In this case, the last update date and time is stored as the time setting date and time 204 and timing for updating the secure clock 203 is managed.

However, from the viewpoint of cost of the apparatus itself of the content reproducer 210, if time is acquired from the DRM time server 213 every time a viewing expiration time is determined and decided, the secure clock 203 does not need to be included and components can be reduced. Therefore, it is possible to reduce cost.

In the first embodiment, in the content reproducer 210, the secure clock 114 is used concerning content for which the time reference server URL 200 is not designated and the secure clock 203 is used concerning content for which the time reference server URL 200 is designated. However, time of the secure clock 203 may also be referred to concerning the content for which the time reference server URL 200 is not designated. This makes it unnecessary to provide the secure clock 114 in the content reproducer 210.

In the first embodiment, when the content receiver 211 reproduces content stored in the storage medium 131, determination of a viewing expiration time is performed by using date and time information of the secure clock 134. However, in determination of a viewing expiration time in the content receiver 211, as in the content reproducer 210, it is also possible to acquire time from the DRM time server 213 and perform determination of a viewing expiration time on the basis of the time.

In the first embodiment, the time reference server URL 200 is used for a method of designating a time acquisition destination designated from the DRM server 212. However, designation of a time acquisition destination is not limited to this. Specifically, the content reproducer 210 only has to be able to perform time reference designated by a DRM side. It goes without saying that the same effect can be obtained when, for example, time acquisition from a radio clock or time acquisition from an NTP (Network Time Protocol) is designated from the DRM side.

In the explanation of the first embodiment, the SD card 103 is used as an example of the exchangeable medium. However, the present invention can also be applied to exchangeable media other than an SD memory card. As examples of the exchangeable media, an SD memory card, a USB memory card, and the like can also be used.

In the explanation of the first embodiment, the DRM time server 213 separate from the DRM server 212 is used as the second time supply source of the present invention managed by the DRM. However, it is also possible that the DRM time server 213 is not provided and the DRM server 212 has a function of supplying time managed by the DRM. In that case, a URL of the DRM server 212 is set as a destination indicated by the time reference server URL 200 supplied to the content receiver 211 by the DRM server 212.

As explained above, since the content receiver and the content reproducer of the present invention are used, even when a viewing expiration time of content downloaded from a content server is designated from a DRM server and converted into a viewing expiration time of a CPS system when the viewing expiration time is written out to an exchangeable medium, an original viewing expiration time intended by a DRM system can be observed on a CPS side. Specifically, even when the content receiver that receives content, a viewing expiration time of which is managed by the DRM, writes out the content on an exchangeable medium protected by the CPS, the content reproducer which reproduces the content on this exchangeable medium can correctly acquire time from an original DRM server and perform viewing expiration time determination for the content. Therefore, it is possible to sell a user a content viewing license as intended by a content right holder and a provider which performs content delivery.

It is possible to more flexibly cope with, for example, changes in a data structure and a format of the viewing conditions 130 received from a server when the functions of the viewing expiration time determining unit 133, the viewing condition converting unit 206, and the like of the content receiver 211 are realized by software by causing a CPU to execute a program than when the functions are realized only by hardware. Further, it is possible to more flexibly cope with, for example, a change in a data structure of content management information when functions of the viewing expiration time acquiring unit 205, the viewing expiration time determining unit 202, and the like of the content reproducer 210 are also realized by software.

A program according to the present invention is a program for causing a computer to execute the operation of the step of writing out, to the exchangeable medium, in association with the content, time supply source designation information indicating a second time supply source designated in the copyright protection system instead of a first time supply source of the content protection system which a content reproducer having the exchangeable medium inserted therein refers to in order to specify present time used in determining a viewing expiration time in the content protection system of the content writing-out method and is a program which operates in cooperation with the computer.

A program according to the present invention is a program for causing a computer to execute the operation of the step of performing, when time supply source designation information indicating a second time supply source designated in a copyright protection system in association with content, a viewing expiration time of which is managed in the copyright protection system, is recorded on the exchangeable medium, viewing expiration time determination for the content recorded in the exchangeable medium referring to time obtained on the basis of the second time supply source indicated by the time supply source designation information instead of a first time supply source in the content protection system referred to in order to specify present time used in determining a viewing expiration time in the content protection system in the viewing expiration time determining method and is a program which operates in cooperation with the computer.

The "operation of the steps" according to the present invention means the operation of all or a part of the steps.

A form of use of the program according to the present invention may be a form in which the program is recorded on a recording medium such as a ROM readable by a computer and operates in cooperation with the computer.

A form of use of the program according to the present invention may be a form in which the program is transmitted through a transmission medium such as the Internet or a transmission medium such as light or a radio wave, read by a computer, and operates in cooperation with the computer.

The computer according to the present invention explained above is not limited to pure hardware such as a CPU and may include firmware, an OS, and peripheral equipment.

As explained above, the configuration of the present invention may be realized in terms of software or may be realized in terms of hardware.

The content receiver, the content reproducer, the content reproducing system, the content writing-out method, the viewing expiration time determining method, and the like according to the present invention have an effect that, when content, a viewing expiration time for which is managed in a copyright protection system, is written out to an exchangeable medium, management of the viewing expiration time corresponding to reliability of time management specified by the copyright protection system even to the written-out content and are useful as a content receiver, a content reproducer, a content reproducing system, a content writing-out method, a viewing expiration time determining method, and the like for downloading rental content protected by copyright from a content server on a network, writing out the rental content to an exchangeable medium together with a viewing expiration time, and determining a viewing expiration time on the exchangeable medium with the content reproducer to determine possibility of reproduction of the content.

What is claimed is:

1. A content receiver which receives content, a viewing expiration time of which is managed in a copyright protection system, from a content server and writes out the content to an exchangeable medium managed in a content protection system, the content receiver comprising:
a writing-out processor which is configured to write out, to the exchangeable medium, in association with the content, time supply source designation information for designating a time supply source for providing a viewing expiration time for the content, the time supply source designation information indicating a second time supply source designated in the copyright protection system, instead of a first time supply source for the content protection system, which a content reproducer having the exchangeable medium inserted therein refers to in order to specify a present time used in determining a viewing expiration time for the content protection system.

2. The content receiver according to claim 1, wherein the writing-out processor also writes out, to the exchangeable medium, viewing expiration time information of the content provided by the copyright protection system.

3. The content receiver according to claim 1, wherein the time supply source designation information written out to the exchangeable medium by the writing-out processor is a Uniform Resource Locator (URL) of a server managed in the copyright protection system.

4. The content receiver according to claim 2, further comprising a viewing condition converting unit which converts, when the viewing expiration time information of the content is a length of time in which the content is viewable, the viewing expiration time information of the content into deadline date and time until when the content is viewable, wherein the writing-out processor writes out the viewing expiration time information converted by the viewing condition converting unit to the exchangeable medium.

5. A content writing-out method in a content receiver which receives content, a viewing expiration time of which is managed in a copyright protection system, from a content server and writes out the content to an exchangeable medium managed in a content protection system, the content writing-out method comprising writing out, to the exchangeable medium, in association with the content, time supply source designation information for designating a time supply source for providing a viewing expiration time for the content, the time supply source designation information indicating a second time supply source designated in the copyright protection system, instead of a first time supply source for the content protection system, which a content reproducer having the exchangeable medium inserted therein refers to in order to specify a present time used in determining a viewing expiration time for the content protection system.

6. A non-transitory computer-readable recording medium storing a program, the program causing a computer to execute a content writing-out method in a content receiver which receives content, a viewing expiration time of which is managed in a copyright protection system, from a content server and writes out the content to an exchangeable medium managed in a content protection system, the content writing-out method comprising writing out, to the exchangeable medium, in association with the content, time supply source designation information for designating a time supply source for providing a viewing expiration time for the content, the time supply source designation information indicating a second time supply source designated in the copyright protection system, instead of a first time supply source for the content protection system, which a content reproducer having the exchangeable medium inserted therein refers to in order to specify a present time used in determining a viewing expiration time for the content protection system.

* * * * *